US010272802B2

(12) United States Patent
Matsufuji et al.

(10) Patent No.: US 10,272,802 B2
(45) Date of Patent: Apr. 30, 2019

(54) SEAT SLIDE DEVICE FOR VEHICLES

(71) Applicant: AISIN SEIKI KABUSHIKI KAISHA, Kariya-shi (JP)

(72) Inventors: Tomio Matsufuji, Toyota (JP); Takashi Hattori, Toyota (JP); Kosuke Taniguchi, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/771,145

(22) PCT Filed: Oct. 28, 2016

(86) PCT No.: PCT/JP2016/082101
§ 371 (c)(1),
(2) Date: Apr. 30, 2018

(87) PCT Pub. No.: WO2017/077960
PCT Pub. Date: May 11, 2017

(65) Prior Publication Data
US 2018/0304778 A1    Oct. 25, 2018

(30) Foreign Application Priority Data
Nov. 2, 2015   (JP) ................................ 2015-215782

(51) Int. Cl.
*F16M 13/00*   (2006.01)
*B60N 2/08*    (2006.01)

(52) U.S. Cl.
CPC ............. *B60N 2/0881* (2013.01); *B60N 2/08* (2013.01); *B60N 2/0806* (2013.01)

(58) Field of Classification Search
CPC ............................ B60N 2/0881; B60N 2/0806
(Continued)

(56) References Cited

U.S. PATENT DOCUMENTS 9,827,878 B1 *   11/2017   Matsufuji ................ B60N 2/07
2016/0221477 A1 *  8/2016   Satoh .................. B60N 2/0837

FOREIGN PATENT DOCUMENTS

JP           2015-83426 A      4/2015

OTHER PUBLICATIONS

English translational of the International Preliminary Report on Patentability and Written Opinion dated May 8, 2018 in PCT/JP2016/082101.

(Continued)

*Primary Examiner* — Todd M Epps
(74) *Attorney, Agent, or Firm* — Oblon, McClelland, Maier & Neustadt, L.L.P.

(57) ABSTRACT

A seat slide device for vehicles includes a lower rail, an upper rail, a lock mechanism, a spring member, and an unlocking handle. The upper rail is supported in a slidable manner by the lower rail. The lock mechanism is provided within the upper rail and restricts the movement of the upper rail relative to the lower rail. The spring member is provided within the upper rail. The unlocking handle is operated against the pressing force of the spring member to remove restrictions on the movement of the upper rail imposed by the lock mechanism. The upper rail has inner walls and outer walls. The inner walls have engagement holes formed through the inner walls in the width direction. The spring member has engagement sections inserted through and engaged with the engagement holes. The engagement sections face the outer walls in the width direction.

5 Claims, 4 Drawing Sheets

(58) Field of Classification Search
USPC .................... 248/429, 424; 296/65.13, 65.15
See application file for complete search history.

(56) References Cited

OTHER PUBLICATIONS

International Search Report dated Dec. 27, 2016 in PCT/JP2016/082101 filed Oct. 28, 2016.

* cited by examiner

SEAT SLIDE DEVICE FOR VEHICLES

TECHNICAL FIELD

The present invention relates to a vehicle seat slide device.

BACKGROUND ART

Patent document 1 describes an example of a vehicle seat slide device known in the art. The vehicle seat slide device includes a lower rail fixed to a vehicle floor and an upper rail supported by the lower rail in a slidable manner. The upper rail supports a seat. Further, the upper rail accommodates a lock mechanism that restricts movement of the upper rail relative to the lower rail and a spring member that biases a cancellation handle, which is used to cancel the movement restriction of the upper rail imposed by the lock mechanism.

To fix the spring member to the upper rail, as illustrated in patent document 1, engagement portions of the spring member are inserted through engagement holes formed in an upper edge of the upper rail from the inner side in the widthwise direction. This engages the engagement portions of the spring member with the engagement holes. In this manner, the spring member is fixed to the upper rail.

PRIOR ART DOCUMENT

Patent Document

Patent Document 1: Japanese Laid-Open Patent Publication No. 2015-83426

SUMMARY OF THE INVENTION

Problems That are to be Solved by the Invention

However, in the vehicle seat slide device of patent document 1, the engagement portions of the spring member project out of the upper rail from the engagement holes in the upper edge of the upper rail. That is, the engagement portions of the spring member are exposed from the upper rail. Thus, the engagement portions are susceptible to external impact. When the engagement portions receive external impact and fall out of the engagement holes, the spring member is separated from the upper rail and the cancellation handle becomes non-biased. There is room for improvement in this respect.

It is an object of the present invention to provide a vehicle seat slide device that limits the external impact received by engagement portions of a spring member.

Means for Solving the Problem

To achieve the above object, a vehicle seat slide device according to one aspect of the present invention includes a lower rail, an upper rail, a lock mechanism, a spring member, and a cancellation handle. The lower rail is fixed to a vehicle floor. The upper rail is supported by the lower rail in a slidable manner. The upper rail supports a seat. The lock mechanism is arranged in the upper rail. The lock mechanism restricts movement of the upper rail relative to the lower rail. The spring member is arranged in the upper rail. The cancellation handle is operated against a biasing force of the spring member to cancel the movement restriction of the upper rail imposed by the lock mechanism. The upper rail includes two inner walls that are arranged next to each other in a widthwise direction and two outer walls that respectively extend from lower ends of the two inner walls and are located at an outer side of the two inner walls in the widthwise direction. Each of the two inner walls includes an engagement hole extending through the inner wall in the widthwise direction. The spring member includes two engagement portions inserted through and engaged with the engagement holes. Each of the engagement portions faces a corresponding one of the outer walls in the widthwise direction.

EMBODIMENTS OF THE INVENTION

One embodiment of a vehicle seat slide device will now be described.

Figure 1:
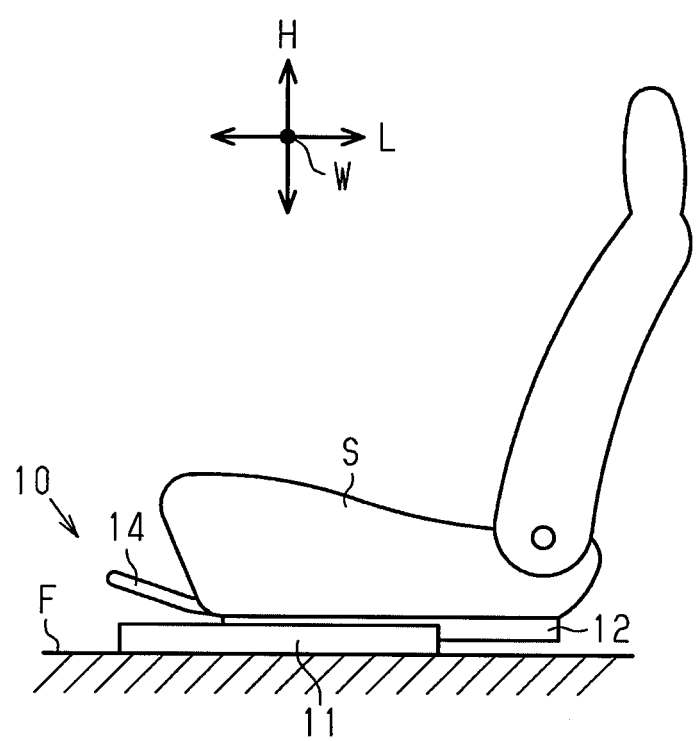
FIG. 1 is a side view showing a vehicle seat to which a vehicle seat slide device according to one embodiment of the present invention is applied.
Figure 2:
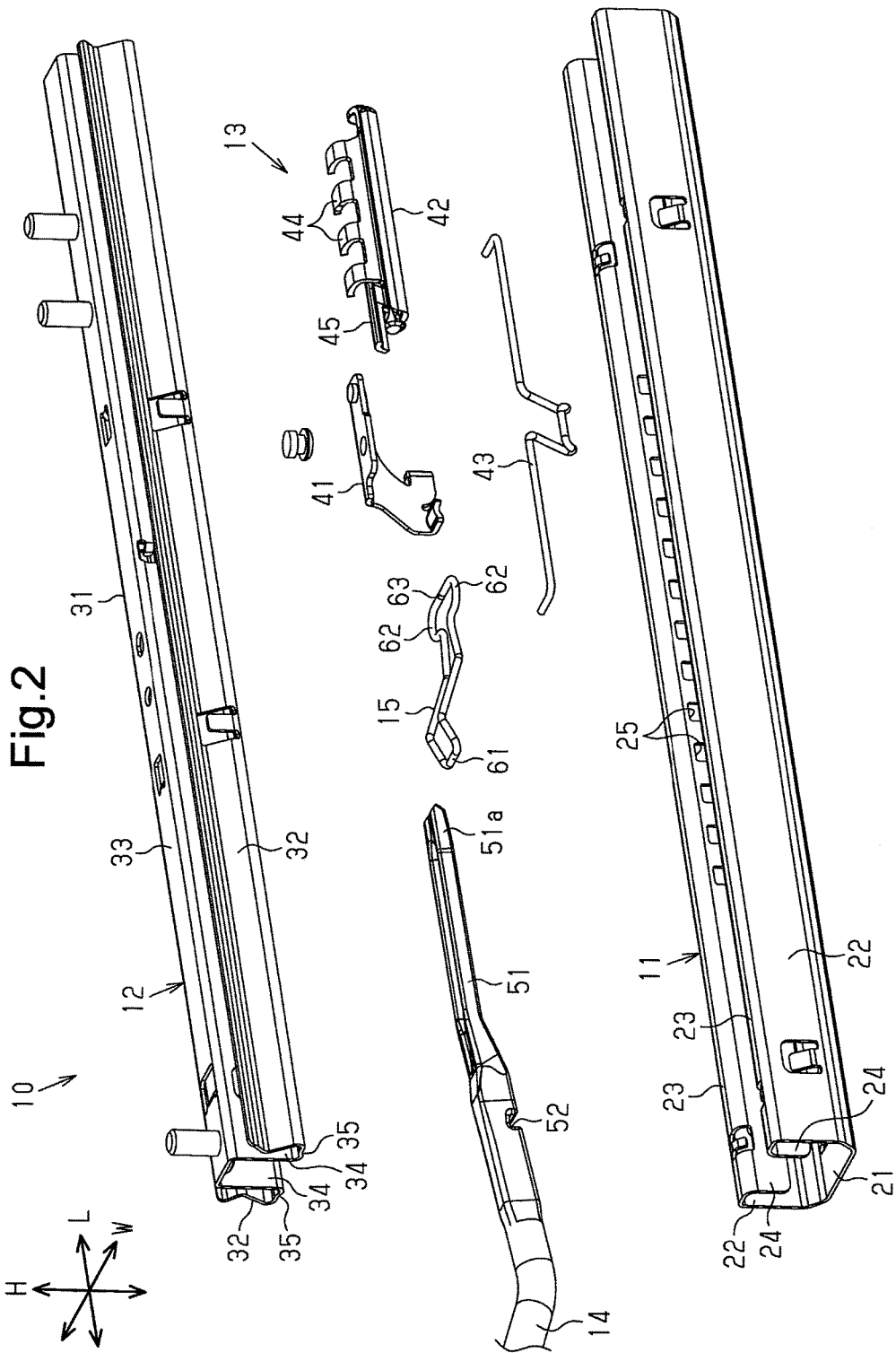
FIG. 2 is an exploded perspective view showing the vehicle seat slide device of FIG. 1.

As shown in FIGS. 1 and 2, a vehicle seat slide device 10 of the present embodiment includes lower rails 11 fixed to a vehicle floor F and upper rails 12 supported by the lower rails 11 in a slidable manner. Further, the vehicle seat slide device 10 includes a lock mechanism 13 that restricts movement of the upper rails 12 relative to the lower rails 11, a cancellation handle 14 used to cancel the movement restriction of the upper rails 12 imposed by the lock mechanism 13, and a spring member 15 that biases the cancellation handle 14.

As shown in FIG. 1, the lower rails 11 extending in a front-to-rear direction L of the vehicle are fixed to the vehicle floor F. The upper rails 12, which move relative to the lower rails 11 in the extending direction of the lower rails 11, are mounted on the lower rails 11. The vehicle seat S is supported above the upper rails 12. A pair of the lower rails 11 and a pair of the upper rails 12 are arranged in a widthwise direction W of the vehicle (direction orthogonal to plane of FIG. 1). The drawing shows the ones that would be located at the left side when viewing the front.

Figure 5:
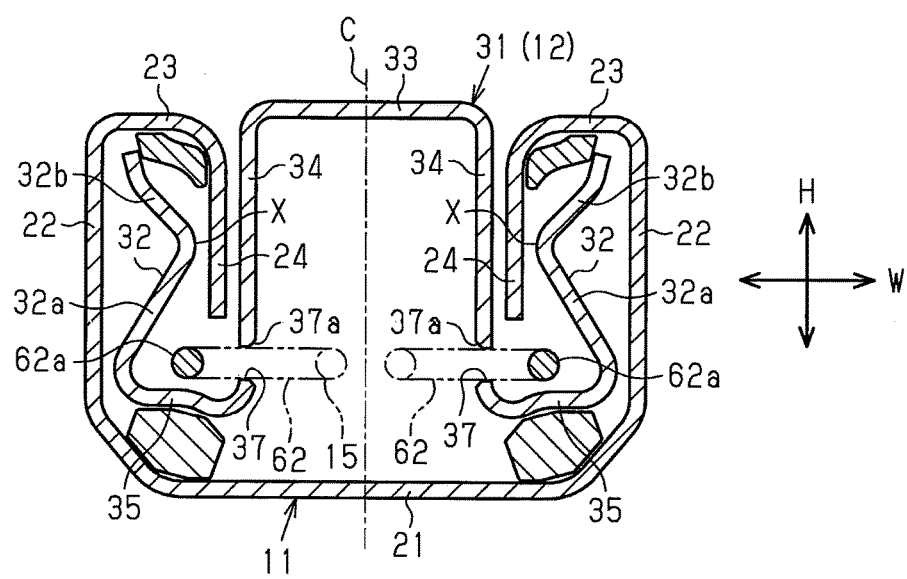
FIG. 5 is a cross-sectional view taken along line 5-5 in FIG. 4.

As shown in FIGS. 2 and 5, the lower rail 11 is formed from a plate material and is configured to be substantially symmetrical with respect to a center line C in the widthwise direction W. The lower rail 11 includes a bottom wall 21 fixed to the vehicle floor F, two side walls 22 that respectively extend upward from two ends of the bottom wall 21 in the widthwise direction W, two inwardly extending walls 23 that respectively extend inward in the widthwise direction W from upper ends of the side walls 22, and two downwardly extending walls 24 that respectively extend downward from distal ends of the inwardly extending walls 23 (inner ends in widthwise direction W). Each side wall 22 and each downwardly extending wall 24 are perpendicular to the widthwise direction W.

A plurality of lock holes 25 extend through the downwardly extending walls 24 in the widthwise direction W and are arranged next to one another in a longitudinal direction (front-to-rear direction L) of the lower rail 11 (refer to FIG.

2). The lock holes 25 may be formed in only one of the left and right downwardly extending walls 24 or may be formed in each downwardly extending wall 24.

Figure 3:
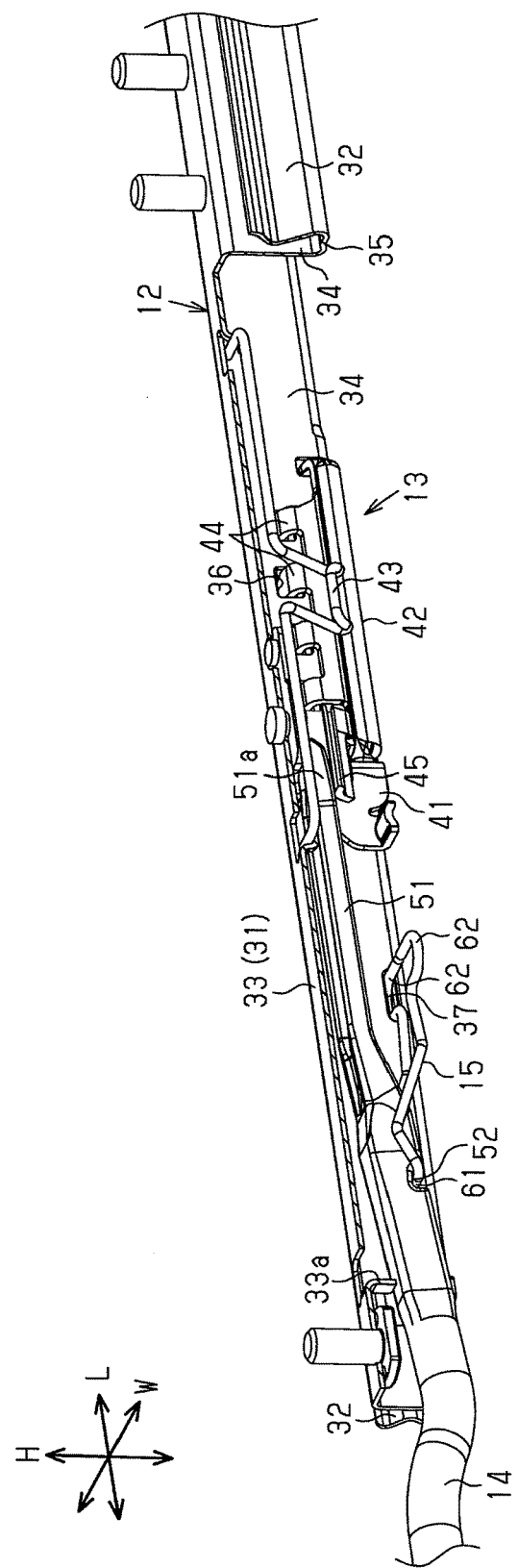
FIG. 3 is a perspective view showing the internal structure of an upper rail of FIG. 2.

As shown in FIGS. 2, 3, and 5, the upper rail 12 is formed from a plate material and is configured to be substantially symmetrical with respect to the center line C in the widthwise direction W. The upper rail 12 includes a body 31 located between the downwardly extending walls 24 of the lower rail 11 and two outer walls 32 that are respectively located at two sides of the body 31 in the widthwise direction W.

The body 31 opens downward and has a U-shaped cross section. More specifically, the body 31 includes an upper wall 33 extending in a rail longitudinal direction (front-to-rear direction L) and two inner walls 34 that respectively extend downward from two ends of the upper wall 33 in the widthwise direction W. Each inner wall 34 is perpendicular to the widthwise direction W. In addition, the upper rail 12 includes two outwardly extending walls 35 that respectively project outward in the widthwise direction W from lower ends of the inner walls 34.

As shown in FIG. 5, the outer walls 32 extend upward from distal ends of the outwardly extending walls 35 (outer ends in widthwise direction W) and are located at the outer sides of the inner walls 34 in the widthwise direction W. Each outer wall 32 includes a first inclined portion 32a and a second inclined portion 32b. The first inclined portion 32a extends upward while being inclined inward in the widthwise direction W from the outwardly extending wall 35 toward the nearby inner wall 34. The second inclined portion 32b extends upward inclined outward in the widthwise direction W from the upper end of the first inclined portion 32a. In other words, each outer wall 32 includes a bent portion (upper end of first inclined portion 32a) that transitions from the first inclined portion 32a to the second inclined portion 32b, and the bent portion is referred to as the innermost portion X that is closest to the adjacent inner wall 34 in the widthwise direction W.

Referring to FIG. 3, a plurality of insertion holes 36 extend through the inner wall 34 of the upper rail 12 in the widthwise direction W and are arranged next to one another in the rail longitudinal direction (front-to-rear direction L). The insertion holes 36 may be formed in only one of the left and right inner walls 34 (inner wall 34 located at side facing lock holes 25) or may be formed in each inner wall 34. Although not illustrated in the drawings, it is preferred that the outer wall 32 include a plurality of insertion holes that correspond to the insertion holes 36 of the inner wall 34.

As shown in FIG. 5, when the lower rail 11 is coupled to the upper rail 12, each downwardly extending wall 24 of the lower rail 11 is arranged from above between the inner wall 34 and the outer wall 32 of the upper rail 12 that are adjacent in the widthwise direction W. The lower end of each downwardly extending wall 24 is located downward from the innermost portion X of the corresponding outer wall 32.

Further, each outer wall 32 of the upper rail 12 is arranged between the side wall 22 and the downwardly extending wall 24 of the lower rail 11 that are adjacent in the widthwise direction W. Spherical rollers (not shown) that smoothly move the upper rail 12 relative to the lower rail 11 are arranged between the second inclined portion 32b of the outer wall 32 of the upper rail 12 and the downwardly extending wall 24 of the lower rail 11 and between the outwardly extending wall 35 of the upper rail 12 and the bottom wall 21 of the lower rail 11.

As shown in FIGS. 2 and 3, the body 31 of the upper rail 12 accommodates the lock mechanism 13. The lock mechanism 13 includes a support member 41 fixed to the upper wall 33 of the body 31, a lock member 42 supported by the support member 41, and a biasing member 43 that is formed by a spring member and biases the lock member 42.

The lock member 42 is pivotally supported by the support member 41 and the upper rail 12. The lock member 42 includes a plurality of (the number of which is the same as that of insertion holes 36) tabs 44 arranged next to one another in the rail longitudinal direction (front-to-rear direction L). The tabs 44 are fitted through the corresponding insertion holes 36 of the upper rail 12 (inner wall 34) into the lock holes 25 of the lower rail 11 (downwardly extending wall 24) and engaged with the lock holes 25 in the rail longitudinal direction. This restricts movement of the upper rail 12 relative to the lower rail 11. Further, the biasing member 43 supported by the upper wall 33 of the upper rail 12 biases the lock member 42 to keep the tabs 44 inserted in (locked to) the lock holes 25 of the lower rail 11.

Figure 4:
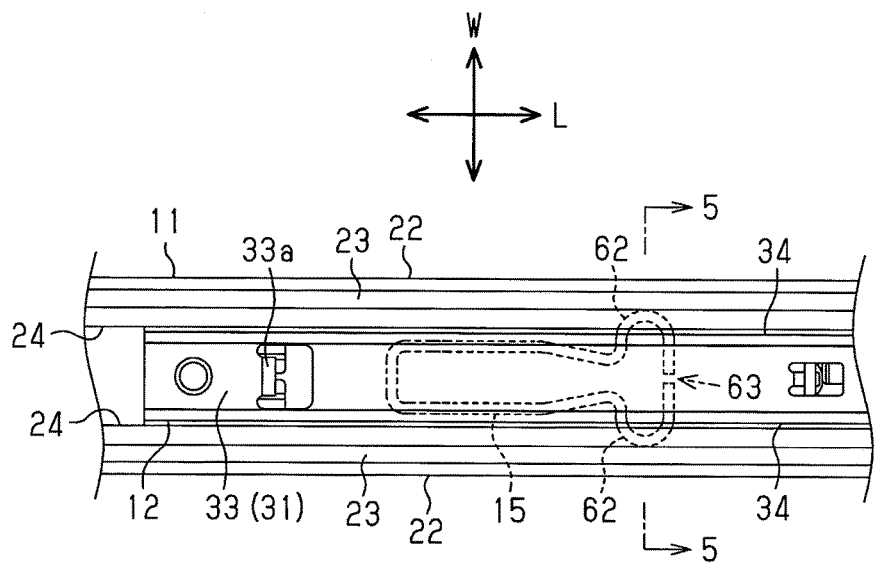
FIG. 4 is a plan view showing the vehicle seat slide device of FIG. 2.

As shown in FIG. 3, the cancellation handle 14 includes an insertion portion 51 extending toward the rear of the vehicle. The insertion portion 51 is inserted into the body 31 of the upper rail 12. The insertion portion 51 includes a distal end 51a (end toward rear of vehicle) located above an input portion 45 of the lock member 42. In FIGS. 4 and 5, the insertion portion 51 of the cancellation handle 14 is not shown.

As shown in FIG. 3, the spring member 15 accommodated in the body 31 of the upper rail 12 upwardly biases the insertion portion 51. More specifically, a distal end (end toward front of vehicle) of the spring member 15 defines a pressing portion 61 fitted into an engagement recess 52 formed in a lower surface of the insertion portion 51 of the cancellation handle 14, and the pressing portion 61 upwardly biases the insertion portion 51. Further, an abutting piece 33a extending downward from the upper wall 33 of the upper rail 12 and abut against an upper surface of the insertion portion 51 is located toward the front of the vehicle from the engagement recess 52 (pressed portion).

When the end of the cancellation handle 14 toward the front of the vehicle is operated and lifted, the insertion portion 51 pivots about the part abut against the abutting portion 33a countering the biasing force of the spring member 15 and downwardly moves the distal end 51a. As a result, the distal end 51a of the insertion portion 51 downwardly presses the input portion 45 of the lock member 42. This pivots the lock member 42 against the biasing force of the biasing member 43 and removes the tabs 44 from at least the lock holes 25 of the lower rail 11. Thus, the restriction of the movement of the upper rail 12 relative to the lower rail 11 is cancelled, and adjustment of the position of the seat S supported by the upper rail 12 is permitted in the front-to-rear direction L.

The structure fixing the spring member 15 will now be described in detail.

As shown in FIGS. 3 and 5, two engagement holes 37 that fix the spring member 15 respectively extend through the two inner walls 34 of the upper rail 12 (body 31) in the widthwise direction W. The engagement holes 37 are symmetrical in the widthwise direction W. That is, the engagement holes 37 are identical in shape and located at opposing positions in the widthwise direction W. Each engagement hole 37 is an elongated hole extending in the rail longitudinal direction. The engagement hole 37 is located downward from the center of the inner wall 34 in a height-wise direction H at the vicinity of the lower end of the inner wall 34. Each engagement hole 37 has an opening end located at the inner side in the widthwise direction W (inner surface of inner wall 34) that is chamfered to define a tapered portion 37a that widens toward the inner side in the widthwise direction W (refer to FIG. 5).

As shown in FIGS. 3 and 4, the spring member 15 is formed by bending a strand of wire having a circular cross section into a predetermined shape that is symmetrical with respect to the widthwise direction W. The spring member 15 includes the pressing portion 61 at the distal end (end toward front of vehicle) and two engagement portions 62 at the basal end (end toward rear of vehicle). Each engagement portion 62 is bent to be U-shaped extending outward in the widthwise direction W in a plan view (refer to FIG. 4). In addition, the basal end of the spring member 15 includes an open end 63. In the open end 63, the two ends of the wire forming the spring member 15 face each other in the widthwise direction W.

As shown in FIGS. 3 and 5, each engagement portion 62 of the spring member 15 is inserted from the inner side of the upper rail 12 into the corresponding engagement hole 37 of the upper rail 12 (corresponding inner wall 34) and engaged with the rim of the engagement hole 37. The engagement fixes the spring member 15 to the upper rail 12. In the fixed state, the pressing portion 61 of the spring member 15 is configured to upwardly bias the insertion portion 51 of the cancellation handle 14.

When coupling the spring member 15 to the upper rail 12, the elasticity of the spring member 15 is used to move the two engagement portions 62 toward the inner side in the widthwise direction W and force the spring member 15 into the body 31. Then, as the spring member 15 returns to its original shape (each engagement portion 62 returns toward the outer side in widthwise direction W), the engagement portions 62 are inserted through the corresponding engagement holes 37 of the body 31.

As shown in FIG. 5, parts of the engagement portions 62 (outer ends in widthwise direction W) project outward in the widthwise direction W from the engagement holes 37. The parts projecting from the engagement holes 37 (projections 62a) are each located in the upper rail 12 between the inner wall 34 and the outer wall 32 that are adjacent in the widthwise direction W. In more detail, the projections 62a of the engagement portions 62 are located downward relative to the innermost portion X of the outer wall 32 between the inner wall 34 and the first inclined portion 32a (outer wall 32) in the widthwise direction W. That is, the projections 62a of the engagement portions 62 face the outer walls 32 in the widthwise direction W. Further, the downwardly extending walls 24 of the lower rail 11 are located above the projections 62a of the engagement portions 62, and the projections 62a face the lower ends of the downwardly extending walls 24 in the height-wise direction H.

The operation of the present embodiment will now be described.

In each engagement portion 62 of the spring member 15, the projection 62a projecting outward in the widthwise direction W from the corresponding engagement hole 37 of the upper rail 12 is located between the inner wall 34 and the outer wall 32 that are adjacent in the widthwise direction W. Thus, the projection 62a of the engagement portion 62 is covered by the outer wall 32 of the upper rail 12 located at the outer sides in the widthwise direction W.

The present embodiment has the advantages described below.

(1) The projections 62a of the engagement portions 62 face the outer walls 32 of the upper rail 12 in the widthwise direction W. That is, the outer walls 32 are located at the outer sides of the projections 62a in the widthwise direction W and limit external impact received by the projections 62a from the outer sides in the widthwise direction W. This avoids separation of the engagement portions 62 from the engagement holes 37 caused by external impact.

(2) The lower rail 11 includes the downwardly extending walls 24 each arranged between the inner wall 34 and the outer wall 32 of the upper rail 12 that are adjacent in the widthwise direction W and located above the engagement portion 62 (projection 62a) of the spring member 15. In this structure, the downwardly extending walls 24 located above the projections 62a of the engagement portions 62 further limit external impact received by the engagement portions 62 of the spring member 15.

(3) Each outer wall 32 of the upper rail 12 includes the first inclined portion 32a that extends upward while being inclined inward in the widthwise direction W, and the corresponding engagement portion 62 (projection 62a) of the spring member 15 is located downward relative to the upper end of the first inclined portion 32a. In this structure, the engagement portion 62 of the spring member 15 is located downward relative to the upper end of the first inclined portion 32a that is where the outer wall 32 is closest to the inner wall 34 (innermost portion X of outer wall 32). This further limits external impact received by the engagement portion 62.

(4) The spring member 15 includes the open end 63 and thus easily flexes in the widthwise direction W. Thus, the spring member 15 can easily be coupled to the upper rail 12 (that is, each engagement portion 62 can easily be inserted through the corresponding engagement hole 37), and flexing of the spring member 15 facilitates separation of the engagement portion from the engagement hole 37. Thus, application of the structure of the present embodiment that limits the separation of the engagement portion 62 to the structure of the spring member 15 having the open end 63 is further advantageous.

(5) The opening end of the inner side of each engagement hole 37 in the widthwise direction W (inner surface of inner wall 34) is chamfered to define the tapered portion 37a that widens toward the inner side in the widthwise direction W. Thus, when the engagement portion 62 of the spring member 15 is inserted through the engagement hole 37 from the inner side in the widthwise direction W, the engagement portion 62 does not get caught and is smoothly inserted. This improves the coupling efficiency.

The above embodiment may be modified as described below.

In the above embodiment, the spring member 15 is formed from a wire having a circular cross section. Instead, for example, the spring member 15 may be formed from a wire having a rectangular cross section.

The structure such as the positional relationship and the like of the lower rail 11, the upper rail 12, and the spring member 15 is not limited to the above embodiment and may be modified in accordance with the structure. For example, the downwardly extending wall 24 of the lower rail 11 may be located at the outer sides of the engagement portion 62 (projection 62a) of the spring member 15 in the widthwise direction W. Additionally, the engagement portion 62 (projection 62a) of the spring member 15 may be located between the inner wall 34 and the second inclined portion 32b of the outer wall 32 in the widthwise direction W.

The structure of the lock mechanism 13 is not limited to the above embodiment. As long as the lock mechanism 13 can restrict movement of the upper rail 12 relative to the lower rail 11, the structure of the lock mechanism 13 may be changed.

The invention claimed is:

1. A vehicle seat slide device comprising:
   a lower rail fixed to a vehicle floor;
   an upper rail supported by the lower rail in a slidable manner, wherein the upper rail supports a seat;
   a lock mechanism arranged in the upper rail, wherein the lock mechanism restricts movement of the upper rail relative to the lower rail;
   a spring member arranged in the upper rail; and
   a cancellation handle operated against a biasing force of the spring member to cancel the movement restriction of the upper rail imposed by the lock mechanism, wherein
   the upper rail includes two inner walls that are arranged next to each other in a widthwise direction and two outer walls that respectively extend from lower ends of the two inner walls and are located at an outer side of the two inner walls in the widthwise direction,
   each of the two inner walls includes an engagement hole extending through the inner wall in the widthwise direction, and
   the spring member includes two engagement portions inserted through and engaged with the engagement holes, wherein each of the engagement portions faces a corresponding one of the outer walls in the widthwise direction.

2. The vehicle seat slide device according to claim 1, wherein the lower rail includes a downwardly extending wall arranged between the inner wall and the outer wall of the upper rail that are adjacent in the widthwise direction and located above the engagement portion of the spring member.

3. The vehicle seat slide device according to claim 1, wherein
   each of the outer walls of the upper rail includes an inclined portion that extends upward while being inclined inward in the widthwise direction, and
   the engagement portion of the spring member is located downward relative to an upper end of the inclined portion.

4. The vehicle seat slide device according to claim 1, wherein the spring member includes an open end.

5. The vehicle seat slide device according to claim 1, wherein an opening end of the engagement hole at an inner side in the widthwise direction includes a tapered portion that widens toward the inner side in the widthwise direction.

* * * * *